1,977,644

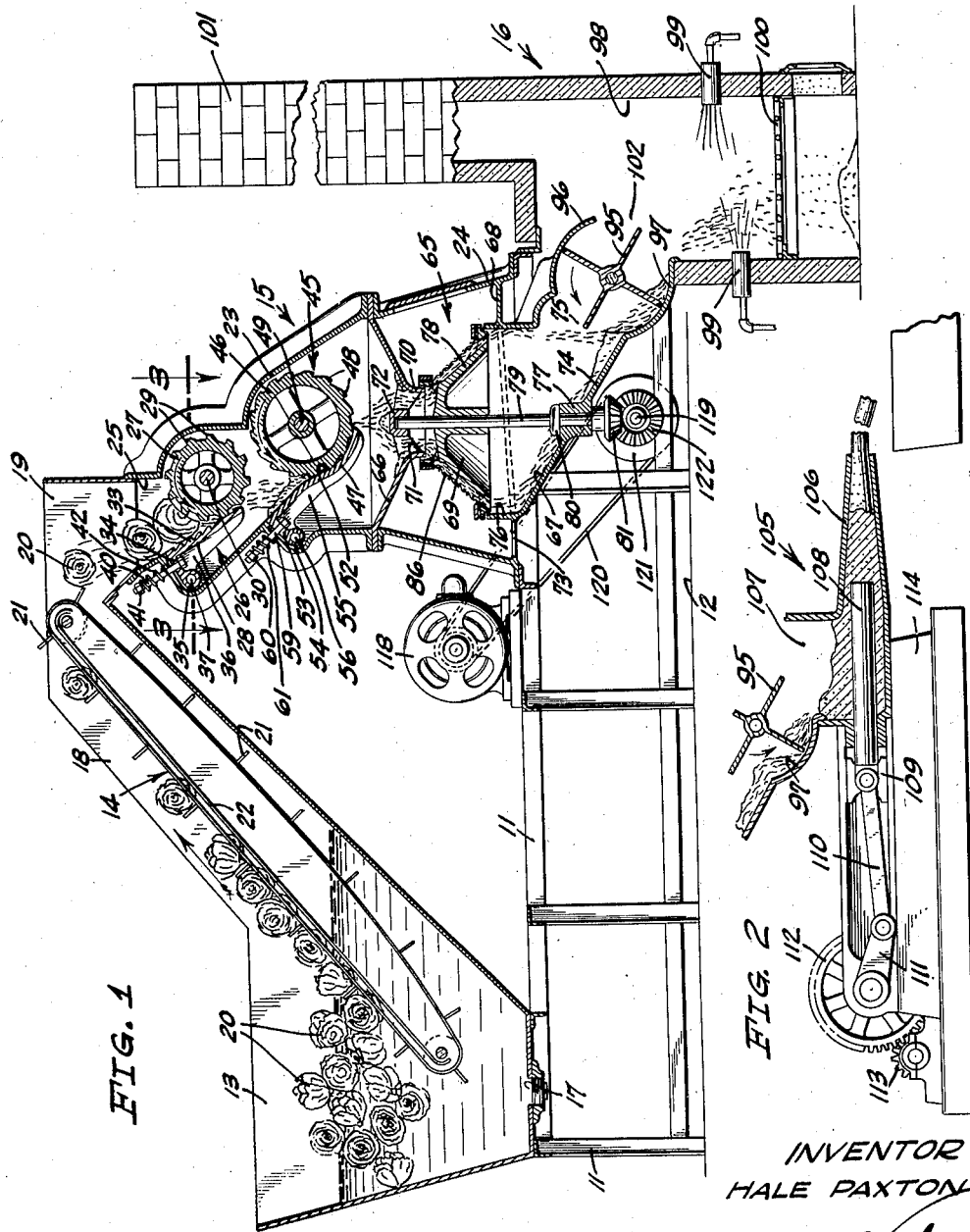
Oct. 23, 1934. H. PAXTON 1,977,644
METHOD OF DISPOSING OF CULL LETTUCE
Filed Feb. 19, 1932 2 Sheets-Sheet 1
INVENTOR
HALE PAXTON
BY
ATTORNEY Oct. 23, 1934.     H. PAXTON     1,977,644
METHOD OF DISPOSING OF CULL LETTUCE
Filed Feb. 19, 1932     2 Sheets-Sheet 2
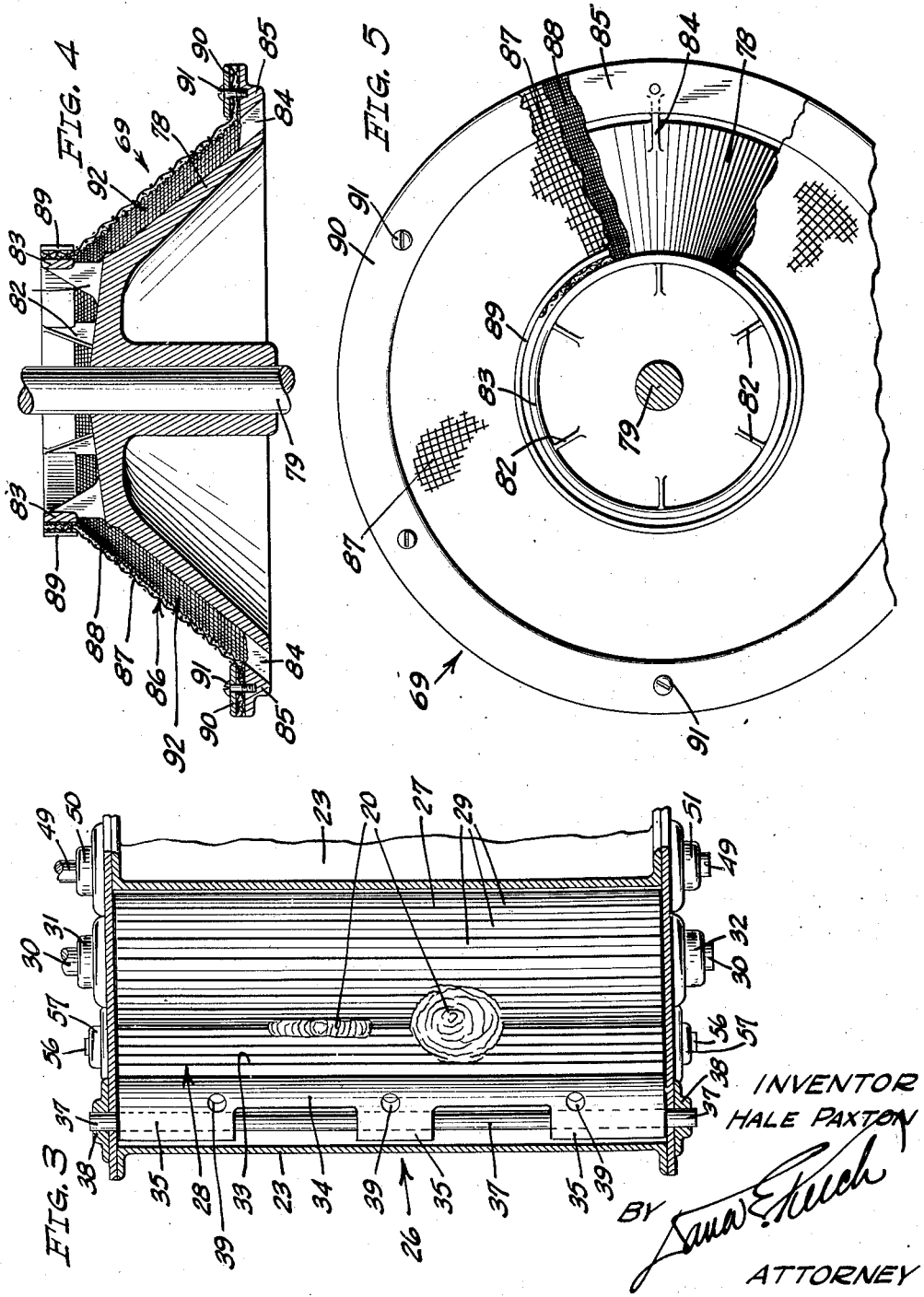
INVENTOR
HALE PAXTON
BY
ATTORNEY Patented Oct. 23, 1934

UNITED STATES PATENT OFFICE 1,977,644

METHOD OF DISPOSING OF CULL LETTUCE

Hale Paxton, Redlands, Calif., assignor to Paxton Credit Corporation, Sanger, Calif., a corporation of California Application February 19, 1932, Serial No. 594,042

2 Claims. (Cl. 71—6)

My invention relates to a method of and apparatus for disposing of cull lettuce, and relates to the same problem as the method covered by my U. S. Letters Patent No. 1,819,480, issued August 18, 1931.

The lettuce crop of the United States is over 100,000 cars per year. In the harvesting, packing and marketing of lettuce, at least one-third of the crop is of cull grade, that is, it is unmarketable. Most of this vast quantity of cull lettuce is sorted out of the harvested crop in the packing house. The present practice is to establish dumping grounds on isolated wasteland to which the cull lettuce is hauled in trucks. An average of two and a half truckloads must be thus hauled away for each car of lettuce shipped to market. In these dumps great heaps of cull lettuce accumulate and the stench of the decaying lettuce is wafted over the countryside almost throughout the year.

It is an object of my invention to dispose of cull lettuce in large quantities inexpensively and in a manner to eliminate decaying dumps.

Another problem of cull lettuce disposal is where a field of lettuce cannot be harvested before it becomes too old and tough to market. This situation occurs rather frequently, and the problem is how to get rid of the old crop in order to prepare the soil for the next planting. Plowing the old crop under results in whole heads of lettuce rotting and making boggy spots in the soil when it is highly desirable that the soil be firm and homogeneous for proper nutriment of the young plants. Furthermore, these rotting lettuce heads become breeding nests for cutworms and other vermin or insects which prey on young lettuce plants, thus greatly increasing the difficulty of controlling these pests.

It is another object of my invention to provide a method of and apparatus for disposing of cull lettuce by which old crops of lettuce may be economically disposed of without injury to new crops and without supplying a breeding medium for predatory pests.

About sixty percent of the solid matter in cull lettuce is nitrogenous, and when in shape to be assimilated by the soil makes a good fertilizer.

It is a still further object of my invention to provide a method of and apparatus for disposing of cull lettuce which eliminates the problems attending the decaying of this, and makes available its nitrogenous fertilizer content for transportation at relatively small cost and application at the most advantageous season wherever desired, be it near to or remote from the point of production of the lettuce.

The manner of accomplishing the foregoing objects, as well as further objects and advantages, will be made manifest in the following description, together with the accompanying drawings, in which:

Fig. 1 is a longitudinal sectional view diagrammatically illustrating the apparatus of my invention.

Fig. 2 is a fragmentary sectional view of a modified form of volume reducing unit.

Fig. 3 is an enlarged horizontal sectional view taken on the line 2—2 of Fig. 1.

Fig. 4 is an enlarged sectional view of the dehydrator embodied in my invention.

Fig. 5 is a plan view of the dehydrator shown sectionally in Fig. 3, partially broken away.

Referring specifically to the drawings, a preferred embodiment of my invention is shown in an apparatus 10 which includes a suitable frame 11 supported by a floor 12, a washing tank 13, a conveying mechanism 14, a shredding, pulping and dehydrating unit 15, and a volume reducing unit 16.

The washing tank 13 is mounted on one end of frame 11, and is provided with a drainage outlet 17 and an upwardly inclined trough-like apron 18 clearly shown in Fig. 1. At the upper end of apron 18 a hopper 19 is formed which receives cull lettuce 20 and directs it into the unit 15.

The conveying mechanism 14 is of conventional design, and is mounted within the apron 18 as shown. Fixed at suitable intervals along the conveyor 14 are paddles 21. Secured to the side walls of the tank 13 and apron 18 is a pan 22 which is positioned within the conveyor 14 as shown. The pan 22 supports the cull lettuce 20, while this is being conveyed from the tank 13 up to the hopper 19.

The shredding, pulping and dehydrating unit 15 which is mounted on one end of the frame 11 opposite the washing tank 13, includes an upper housing 23 and a lower housing 24. The upper housing 23 is formed to accommodate the shredding and pulping units, and provided with a mouth 25 to which the lower ends of hopper 19 is fixed.

The shredder generally designated at 26 is located directly below the mouth 25 in the upper section of housing 23, and consists of a cylindrical cutter 27, and a shoe 28. The cutter 27 which is provided with a plurality of teeth 29 coextensive with the length of the cutter is keyed to a driving shaft 30 which is journalled in bearings 31 and 32 provided on the housing 23.

The shoe 28, shown in Figs. 1 and 3, is coextensive with the cutter 27 and has a serrated shredding face 33, a web member 34, hubs 35, and strengthening ribs 36 which are preferably formed integral with the shoe. Extending through the hubs 30 is a shaft 37, the opposite ends of which are journalled in bearings 38 provided on the housing 23.

The web 34 is provided with holes 39 which register with similar holes in the housing 23 for the reception of bolts 40, one of which is shown in Fig. 1. The bolts 40 are inserted through the holes 39 from the underside of the shoe 28, the heads of the bolts 40 abutting the web 34.

The shanks of the bolts 40 which extend exteriorly of the housing 23 are provided with nuts 41 and compression springs 42 interposed between the nuts 41 and the housing 23. It may now be seen that by tightening the nuts 41 against the springs 42, the shoe 28 will be drawn against the housing 23, and the face 33 of the shoe 28 will be brought into close proximity with the cutting edges of the cylindrical cutter 27. It will also be seen that heads of cull lettuce 20 are supported against the cutting action of the cylindrical cutter 27 by the serrated face 33 of the shoe 28, and that the shoe 28 being yieldably mounted will permit foreign bodies, such as small stones and the like, to pass through the shredding unit without damaging or stalling the machine.

The pulper, generally designated at 45, is positioned within the upper housing 23 directly below the shredder 26, and includes a cylindrical pulping member 46, and a shoe 47. The member 46 is provided with ratchet-like teeth 48 which are coextensive longitudinally therewith, and is keyed to a driving shaft 49 which is journalled in bearings 50 and 51 provided on the housing 23. It will be noted that the sharp edges of the teeth 48 of the cylinder 46 face in the opposite direction from that in which the pulping cylinder rotates.

The shoe 47 is coextensive with the pulping cylinder 46, and has a smooth pulping face 52 which is curved at its lower side to conform to the periphery of the pulping cylinder 46. Integral with the shoe 47 is a web member 53, hubs 54, and strengthening ribs 55. Extending through the hubs 54 is a shaft 56 journalled at its opposite ends in bearings 57 provided on the housing 23.

The web 53 is provided with holes 58 which register with similar holes in the housing 23 for the reception of bolts 59, one of which is shown in Fig. 1. The bolts 59 are inserted through the holes 58 from the underside of the shoe 47, the heads of the bolts 59 abutting the web 53.

The threaded shanks of the bolts 59 which extend exteriorly of the housing 23 are provided with nuts 60, and compression springs 61 interposed between the nuts 60 and the web 53.

The general construction of the pulper 45 is similar to that of the shredder 26, except that the teeth 48 of the pulper face opposite the direction of rotation, while the teeth 29 of the cutter 27 face with the direction of rotation. The shoe 47 of the pulper differs from the shoe 28 of the shredder in that the face 33 of the shoe 28 is serrated and substantially flat, while the face 52 of the shoe 47 is smooth and curved in part to fit the cylinder 46. The action of the pulper 45 differs from the cutting action of the shredder 26 in that the pulping cylinder 46 smears the shredded lettuce received from the shredding unit 26 against the curved face 52 of the shoe 47.

Contained within the lower housing 24 of the unit 15 is a dehydrator, generally designated at 65, which includes an upper hopper 66, a lower hopper 67, a liquid receiving pan 68, and a rotatable member 69.

The upper hopper 66 which is interposed between the upper and lower housings 23 and 24, respectively, of unit 15 is provided at its center with an annular depending neck 70 which defines a circular opening 71. Supported concentrically within the opening 71 is a bearing 72.

The lower hopper 67 and the liquid receiving pan 68 are positioned at the bottom of the lower housing 24, and are formed integral therewith. The pan 68 is provided with a drainage opening 73.

The lower hopper 67 comprises an inclined bottom 74, a suitable discharge opening 75, and an annular upstanding mouth 76 which extends above the bottom of the liquid receiving pan 68 in concentric relation with the aforedescribed neck 70 of the upper hopper 66. Formed integral with the bottom 74 of the lower hopper 67 is a bearing 77 positioned in vertical alignment with the aforementioned bearing 72 supported by the hopper 66.

The rotatable member 69, clearly shown in Figs. 1, 4 and 5, includes a hollow frustro-conical body 78 secured to a shaft 79 which is supported by the bearings 72 and 77 as shown in Fig. 1. The shaft 79 is provided with a thrust collar 80, and a driven bevel gear 81. Concentrically supported above the smaller end of the body 78 by a plurality of ribs 82 is a ring 83, clearly shown in Fig. 4. Concentrically supported at the larger end of the body 78 by ribs 84 is a ring 85. The rings 83 and 85 are supported in spaced relation with respect to the body 78, and are adapted to support the ends of a porous frusto-conical cage 86. The cage 86 is formed of any suitable two ply fabric, the outer ply 87 being comparatively coarse, such as heavy wire screen or perforated sheet metal, and the inner ply 88 being of comparatively fine mesh, such as canvas or closely woven wire screen.

The cage 86 is secured to the upper ring 83 by a tightly fitting metal band 89, and is clamped upon the lower ring 85 by a metal ring 90 which is secured in place by screws 91. It may now be seen that the cage 86 and the body 78 are so positioned to define therebetween a frusto-conical passageway 92 having an annular opening at the top and bottom thereof.

The rotatable member 69 is positioned below the hopper 66 and above the hopper 67, as shown in Fig. 1, with the ring 83 overlapping the lower edge of the neck 70 of hopper 66, and a portion of the ring 90 being disposed within the upper edge of the mouth 76 of the hopper 67.

Positioned adjacent to the discharge opening 75 of the hopper 67 is a paddle wheel 95 suitably mounted to rotate within concentric curved surfaces 96 and 97 in the direction indicated by the arrow on Fig. 1.

The volume reducing unit 16 shown in Fig. 1 comprises an incinerating furnace 98 of any desirable design provided with conventional gas burning jets 99, a grate 100, a flue 101, and a mouth 102. The furnace 98 is positioned adjacent to the end of frame 11 of apparatus 10 with the mouth 102 of the furnace opposite the paddle wheel 95. As shown in Fig. 1, the furnace 98 is preferably positioned below the level of the floor 12 permitting the cull lettuce pulp to gravitate from the paddle wheel 95 into the furnace.

A modified form of volume reducing unit is shown in Fig. 2, and generally designated at 105, this being identical with the volume reducing unit disclosed in my U. S. Letters Patent No. 1,819,480, and comprises a compression tube 106 having a mouth 107 located below the aforedescribed paddle wheel 95. Positioned to reciprocate within the tube 106 is a plunger 108 which is supported by a cross head 109 and actuated in a conventional manner by a connecting rod 110, a crank 111, and a gear 112 driven by a pinion 113, all supported by a suitable frame 114.

To supply power to the various units of the apparatus 10, I provide an electric motor 118 mounted on the frame 11. Journalled transversely on the frame 11 below the shredding, pulping, and dehydrating unit 15 is a shaft 119 which is driven in any desirable manner by the motor 118 as by a belt 120 and a pulley 121. Mounted on the end of the shaft 119 opposite the pulley 121 is a bevel gear 122 which meshes with the gear 81 thus driving the rotatable member 69 of the dehydrator 65. The conveyor 14, shredder 26, pulper 45, and paddlewheel 95 are all driven at their proper respective speeds from the shaft 119 by any desirable means (not shown).

The operation of my apparatus carrying out the process of my invention is as follows:

The conveyor 14, the shredding, pulping, and dehydrating unit 15, and the paddle wheel 95 are simultaneously set into action by the motor 118, and operate continuously during the time the apparatus 10 is being used.

Cull lettuce 20, subject to disposal, is discharged from lettuce packing tables or other sources into the washing tank 13 where it is washed free of dirt and other foreign materials by the churning action of the conveying mechanism 14. While soaking in the tank 13, the lettuce absorbs a certain amount of water which tends to make the lettuce crisp and tender, thus facilitating the action of the subsequent operations to be performed on the lettuce. The conveyor 14 removes the lettuce from the tank 13 and conveys the same up to the hopper 19 where it is discharged through the mouth 25 of the shredding, pulping, and dehydrating unit 15. At this point the lettuce gravitates into the V-shaped depression defined by the cutter 27 and the shoe 28 of the shredding unit 26, and is cut into shreds by the latter.

The shredded lettuce gravitates from the shredding unit into the pulping unit 45, and the shreds of lettuce are smeared against the shoe 47 by the pulping cylinder 46 which rotates in the direction of the arrow in Fig. 1. The cellular structure of the lettuce is broken down by the action of the pulping unit 45, and the water contained in the cells is liberated and discharged with the lettuce pulp into the hopper 66. The opening 71 in the hopper 66 allows the pulp deposited in the hopper to fall into the rotatable member 69 of the dehydrator 65. As the member 69 is rotating at a comparatively high rate of speed the lettuce pulp and water deposited therein is thrown by centrifugal force into the frusto-conical passageway 92 of the rotatable member 69. Lettuce pulp thus confined in the passageway 92 will be carried toward the larger diameter of the member 69 due to the centrifugal force acting on the pulp and due to the angularity of the side walls of the cage 86. It will also be seen that during the progress of the pulp from the smaller to the larger diameter of the passageway 92, the free water content of the pulp will be thrown through the porous cage 86 to be collected by the pan 68 while the solid pulp will be thrown from the lower opening of the passageway 92 into the hopper 67. The paddle wheel 95, revolving in the direction of the arrow in Fig. 1, serves to feed the dehydrated lettuce pulp from the hopper 67 into the volume reducing unit 16, and also serves to prevent any appreciable amount of smoke and other combustion gases from entering the unit 15 when a furnace, as shown in Fig. 1, is used as a volume reducing unit.

Dehydrated lettuce pulp discharged into the furnace 98 by the paddle wheel 95 is oxidized by the high degree of heat produced in the furnace 98 by the gas burning jets 99. The remaining ash of the lettuce pulp sifts through the grate 100 to a suitable ash pit from which it is removed from time to time.

When the volume reducing units shown in Fig. 2, generally designated at 105, is used in place of the furnace 98, the unit 105 is placed adjacent to the end of frame 11 with the mouth 107 of the compression tube 106 disposed below the paddle wheel 95 as shown. When the plunger 108 is drawn into retracted position the pulp in the mouth 107 drops downwardly before the plunger so that upon the next extension of the plunger into the tapered tube 106 the pulp thus pushed in front of the plunger is forced against the pulp already in the tube 106 so as to compress the pulp into rod-like form as illustrated in Fig. 2. It will be seen that the rod-like pulp formation discharged from the tube 106 is greatly compressed and of much less volume than the loose pulp which is fed into the mouth of the tube 106.

The great advantage of the apparatus and method of my invention results from the fact that 94% of the lettuce is water, the latter being removed by the pulper 45 and the dehydrator 65, so that the resulting pulp, after being incinerated in the furnace 98 or compacted in the unit 105, constitutes only 1% or less of the bulk of the lettuce required to produce it. The final form to which the pulp is reduced, therefore, makes it very inexpensive to dispose of the cull lettuce as treated by the apparatus and method of my invention. Thus a packing house packing a hundred cars of lettuce per day, which now requires the dumping of two hundred and fifty truck loads of cull lettuce during the day, at an average cost of $375.00, will, by the use of my method and apparatus, disclosed herein, be able to dispose of this amount of cull lettuce by carting away only from three to five truck loads of pulp.

It is also desired to point out that the apparatus 10 can be readily mounted on a trailer hauled by a tractor, the latter supplying power for the operation of the apparatus, and hauled over a field having an unharvested crop which it is desired to dispose of. The crop can be cut up as by a weeder, and the lettuce heads forked into the hopper 26, and the pulp given a rod-like form and collected as the tractor proceeds in its path across the field, or else the desiccated pulp may be allowed to return directly onto the ground where it will be plowed in with the cultivation thereof. The water produced by the desiccator can also be allowed to run onto the land. Thus rotting of whole heads of lettuce on ground which it is necessary be prepared promptly after the harvest for replanting is entirely eliminated, as well as the disadvantages resulting from this and mentioned hereinbefore.

What I claim is:

1. A process for disposing of cull lettuce which consists in: pulping said cull lettuce by grinding the same under high pressure yieldably applied with a wiping motion; centrifuging the liberated moisture from the ruptured cellular structure of the lettuce; and incinerating the resultant material.

2. A process for reducing the bulk of cull lettuce which consists in: shredding said lettuce; rupturing the fiber cells of the lettuce structure by grinding a relatively small stream of the same under high pressure, this being yieldably applied with a wiping motion; and desiccating the lettuce pulp thus produced.

HALE PAXTON.